(12) United States Patent
Hovagim et al.

(10) Patent No.: US 8,744,230 B2
(45) Date of Patent: Jun. 3, 2014

(54) METHOD FOR REAL-TIME CORRELATION OF STREAMING VIDEO TO GEOLOCATION

(75) Inventors: Gregory R. Hovagim, Nashua, NH (US); Jeffrey M. Borden, Nashua, NH (US); Garrett T. Shaw, Hollis, NH (US); Karl D. Brommer, Exeter, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/572,893

(22) Filed: Aug. 13, 2012

(65) Prior Publication Data

US 2013/0039631 A1    Feb. 14, 2013

Related U.S. Application Data

(60) Provisional application No. 61/522,733, filed on Aug. 12, 2011.

(51) Int. Cl.
*H04N 5/765* (2006.01)

(52) U.S. Cl.
USPC .......................................... 386/200; 386/227

(58) Field of Classification Search
USPC ................................................ 386/200, 227
See application file for complete search history.

(56) References Cited

U.S. PATENT DOCUMENTS

| | | |
|---|---|---|
| 6,707,487 B1 | 3/2004 | Aman et al. |
| 6,718,063 B1 | 4/2004 | Lennon et al. |
| 6,873,261 B2 | 3/2005 | Anthony et al. |
| 7,088,385 B2 | 8/2006 | Izumi et al. |
| 7,272,179 B2 | 9/2007 | Siemens et al. |
| 7,403,652 B2 | 7/2008 | Boncyk et al. |
| 7,451,041 B2 | 11/2008 | Laumeyer et al. |
| 7,477,780 B2 | 1/2009 | Boncyk et al. |
| 7,565,008 B2 | 7/2009 | Boncyk et al. |
| 7,573,403 B2 | 8/2009 | Goncalves et al. |
| 7,583,275 B2 | 9/2009 | Neumann et al. |
| 7,796,155 B1 * | 9/2010 | Neely et al. ................... 348/157 |
| 2004/0075645 A1 * | 4/2004 | Taylor et al. .................. 345/157 |
| 2007/0233384 A1 * | 10/2007 | Lee ................. 701/213 |
| 2009/0085740 A1 * | 4/2009 | Klein et al. ................... 340/540 |
| 2010/0311017 A1 * | 12/2010 | Coil et al. ....................... 434/65 |

\* cited by examiner

*Primary Examiner* — Thai Tran
*Assistant Examiner* — Jose Mesa
(74) *Attorney, Agent, or Firm* — Daniel J. Long

(57) ABSTRACT

A real time streaming geolocation method includes recording data and linking it to specific coordinates. The data is selectively stored to a database using a specialized data filtering method, and a streaming video can be created from the stored data. The streaming video can be created in real time, creating a current video simulation of a specific environment. The method also allows for interactive addition, modification and deletion of data, such as points of interest, in the video stream.

17 Claims, 6 Drawing Sheets

METHOD FOR REAL-TIME CORRELATION OF STREAMING VIDEO TO GEOLOCATION

CROSS-REFERENCE TO RELATED APPLICATIONS

This Application claims rights under 35 USC §119(e) from U.S. Application Ser. No. 61/522,733 filed Aug. 12, 2011 the contents of which are incorporated herein by reference.

TECHNICAL FIELD

Embodiments are generally related to data gathering and geolocation. Embodiments are also related to a method and system for real-time correlation of streaming video to geolocation. Embodiments are additionally related to geolocation linked streaming video systems.

BACKGROUND OF THE INVENTION

Geolocation is the identification of the real-world geographic location of an object, such as radar, mobile phone or an Internet-connected computer terminal Geolocation may refer to the practice of assessing the location, or to the actual assessed location.

Geolocation is closely related to positioning but can be distinguished from it by a greater emphasis on determining a meaningful location for example a street address rather than just a set of geographic coordinates. Specifically this involves the use of advanced radio frequency (RF) location systems utilizing, for example, Time Difference Of Arrival (TDOA) where greater specificity of location is possible. TDOA systems often utilize mapping displays or other geographic information system. This is in contrast to more traditional radiolocation technologies, for example direction finding where a line of bearing to a transmitter is achieved and not the specific location.

The rapid growth in mobile devices with built in Global Positioning System (GPS) capability has expanded the average user's appreciation of the importance of geo-location. Early users of Apple's iPhone found that the device could be used for road navigation, eliminating the need for dedicated navigation devices. As the app database has grown an average user now takes it for granted that location services are part of modern life. Foursquare, Color, and Yelp have begun to make social networks tightly coupled to the location. Advanced location dependent Augmented Reality features such as Yelp's Monocle provide a computer enhanced real time perception of the world near a person's location. An of these location dependent features share a basic limitation: they only work when a mobile device is connected to the communication grid. People who travel outside the country with an iPhone or iPad are aware of this but can still get data services if they are willing to pay for it or find a WiFi hotspot. But, many natural scientists and engineers that work in remote regions face a more difficult dilemma—a complete lack of connectivity.

Scientists that work in the field often depend on geospatial databases to conduct their work. A geologist exploring for gold may be trying to find a point on the earth that corresponds to an anomalous area extracted from a satellite or airborne image. A forester may need to do a Similar exercise looking for anomalies associated with insect infestation. Old technologies may be used and navigate to a location identified in the office using a handheld GPS or simple orienteering with a compass. However, many natural phenomena are better understood within their spatial context. Thus there is need of interactive navigation to a remote location using a display device loaded with multiple layers of image other data (typically attributed points, lines, and areas) is highly desirable.

Currently, methods are known for capturing still images that are linked to locations on a particular street. These methods may be limited by the existence of streets, street addresses, and they do not provide video feedback. The areas of interest, particularly for military applications, are often in remote locations, un-accessed by current mapping programs. Additionally, current methods may not allow for interactive insertion and deletion of points of interest within the recorded data.

A need therefore exists for an interactive method for recording data and geolocation-linking that data for areas not easily identified by street address. A need also exists for video recording and geolocation, and for providing real time video streams of location-linked data.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for data gathering and geolocation.

It is another aspect of the disclosed embodiments to provide a method and system for real-time correlation of streaming video to geolocation.

It is yet another aspect of the disclosed embodiments to provide for geolocation linked streaming video systems.

It is another aspect of the present invention to provide for a data recording and geolocation method that records sensor data and links the data to specific coordinates. The sensor data is then selectively stored in a database according to the linked coordinates. The method also includes generating a video stream from the recorded sensor data in response to database queries.

The aforementioned aspects and other objectives and advantages can now be achieved as described herein. A real time streaming geolocation method includes recording data and linking it to specific coordinates is disclosed, The data is selectively stored to a database using a specialized data filtering method, and a streaming video can be created from the stored data. The streaming video can be created in real time, creating a current video simulation of a specific environment. The method also allows for interactive addition, modification, and deletion of data, such as points of interest, in the video stream.

In one embodiment, the sensor data is recorded video. In another embodiment, the specific coordinates are GPS coordinates. In another embodiment, specific points of interest are linked to the sensor data. In another embodiment, the user can modify, delete, and add points of interest with a user interface. In another embodiment, the video stream is generated in real time.

The aforementioned aspects and other objectives and advantages can now be achieved as described herein. A real time streaming geolocation method includes recording data and linking it to specific coordinates. The data is selectively stored to a database using a specialized data filtering method, and a streaming video can be created from the stored data. The streaming video can be created in real time, creating a current video simulation of a specific environment. The method also allows for interactive addition, modification and deletion of data, such as points of interest, in the video stream.

The present invention selectively stores the sensor data using a data filtering method including recording the data to the database if no data exists for the specific coordinates. The data filtering also generates an average image patch from video frames linked to those coordinates and compares that average image patch with the recorded sensor data. If there is a difference above a certain threshold between the sensor data and the average image patch, the sensor data is recorded to thee database. In one embodiment, the sensor data is archived in the database if the difference between the sensor data and the average image patch is below the set threshold.

The present invention can capture multi-spectrum data and fuse it with streaming video. The fused streaming data can then be correlated to GPS locations The present invention may be implemented anywhere on the globe accessible to a GPS satellite.

Because of the multi-spectrum nature of the video output, the user may filter out unwanted information. In one embodiment, the user may choose to view all spectrums of data at the same time and the video may display a fused combination of all spectrum recordings. However, if the user only wishes to view one of the recorded spectrums, filters may hide or not show all the other spectrums. The recordings may be split into a number of different streams, each corresponding to a point of view.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
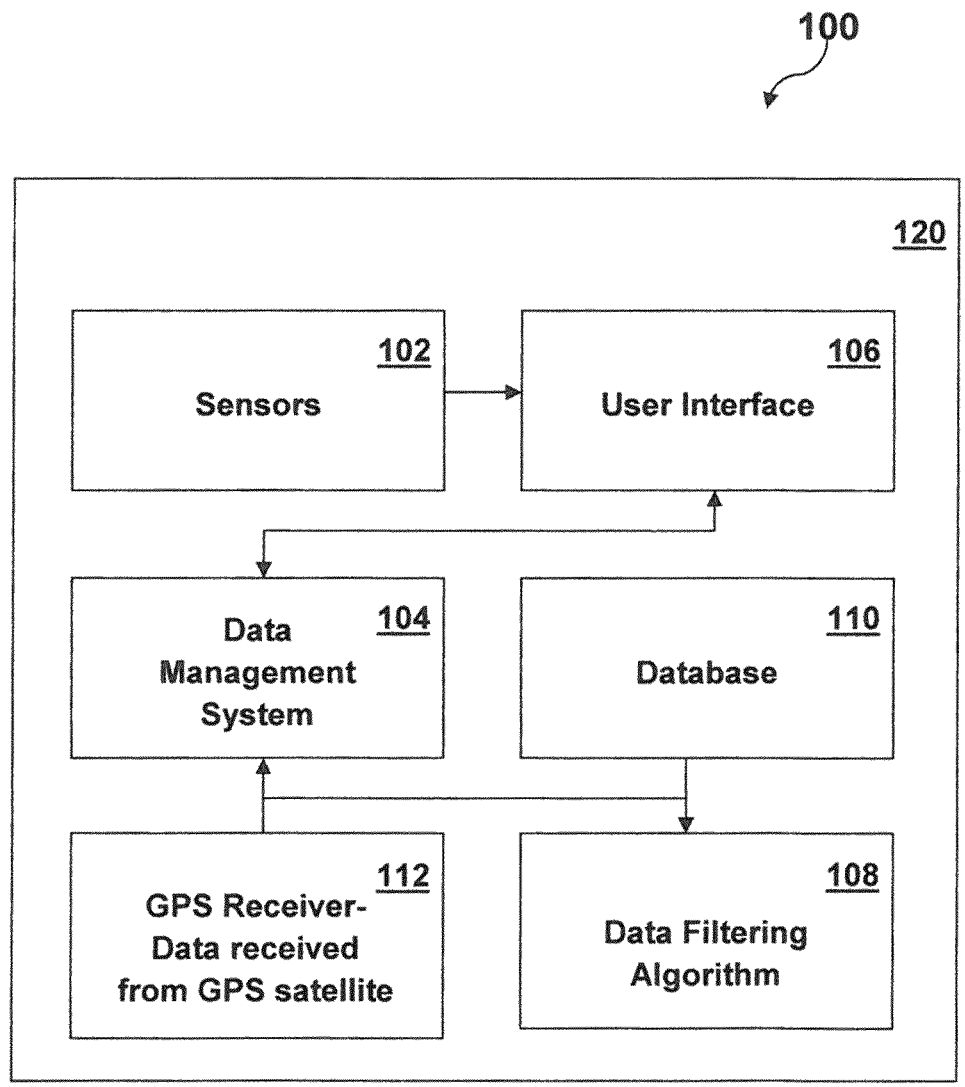
FIG. 1 illustrates a simplified block diagram of a geolocation linked streaming video system, in accordance with the disclosed embodiments.

FIG. 1 illustrates a simplified block diagram of a geolocation linked streaming video system 100, in accordance with the disclosed embodiments. Situational awareness of an environment may be captured using multiple sensors 102 for a complete 360 degrees around a vehicle 120, and all recordings are correlated to their respective GPS position. The vehicle 120 captures video and sensor data, and associates each frame of the data to a GPS location. The data is then sent to a data management system 104, which can then distribute the data to a user interface 106, The data management system 104 filters the data with a data filtering algorithm 108 and new data is sorted by GPS location and stored in a database 110. The GPS receiver 112 can receive GPS location information from GPS satellite.

The user interface 106 allows the user to view the video as it correlates to either the vehicle's location or a simulated training location. In addition to the raw video and data, a relational map can be used to correlate positional information and the route of interest. During filming of the video and sensor data gathering, the data is stored and each frame may be associated with a specific GPS location.

Figure 2:
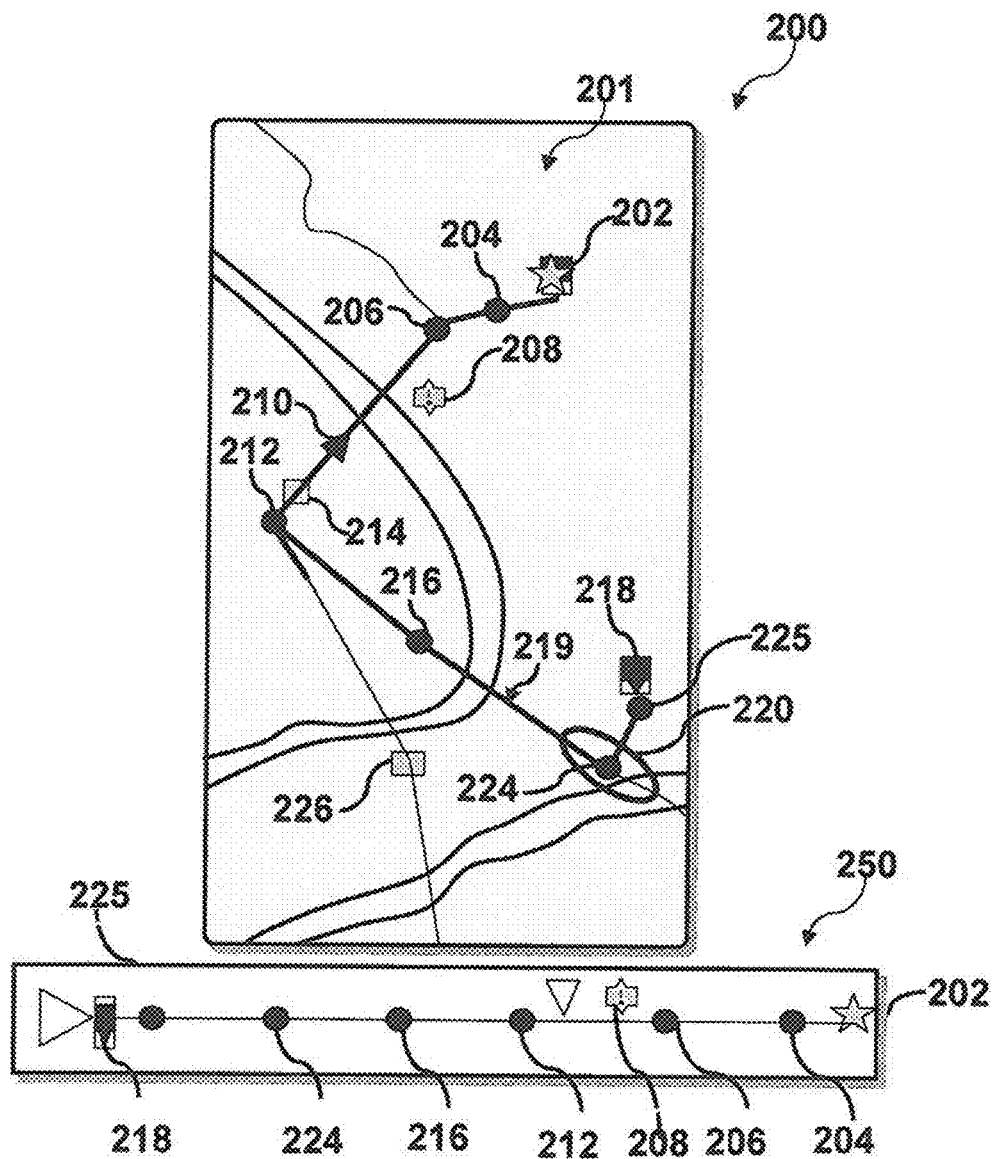
FIG. 2 illustrates an interface of a geolocation linked streaming video system showing a map with various points of interest, in accordance with the disclosed embodiments.

Referring to FIG. 2, a map interface 200 of a geolocation linked streaming video system 100 depicted in FIG. 1 is shown. The map interface 200 may reside on a laptop, or a computing device with video output. The interface 200 shows a map 201 with a list of points that represents a user route 219. The list of points of interest may include for example current location, starting point, destination, known areas of high threat, areas of confirmed IED detonation and known friendly areas. The current location 210, starting point 218, destination 202, known areas of high threat 208 with enemies, area of confirmed denotation 220 and known friendly areas 214 and 226 are shown in the map 201. Status of other areas which are not marked may be either unknown or occupied by civilians. A navigation bar 250 including the points 204, 206, 208, 212, 216, 224 and 225 from the starting point 218 to the destination 202 to form the route 219 is also shown in FIG. 2.

Note that in the interface, there may be one large window housing the entire graphical user interface. A GPS map with integrated points of interest may be displayed. A navigation bar and stitched view may also be displayed.

Figure 3A:
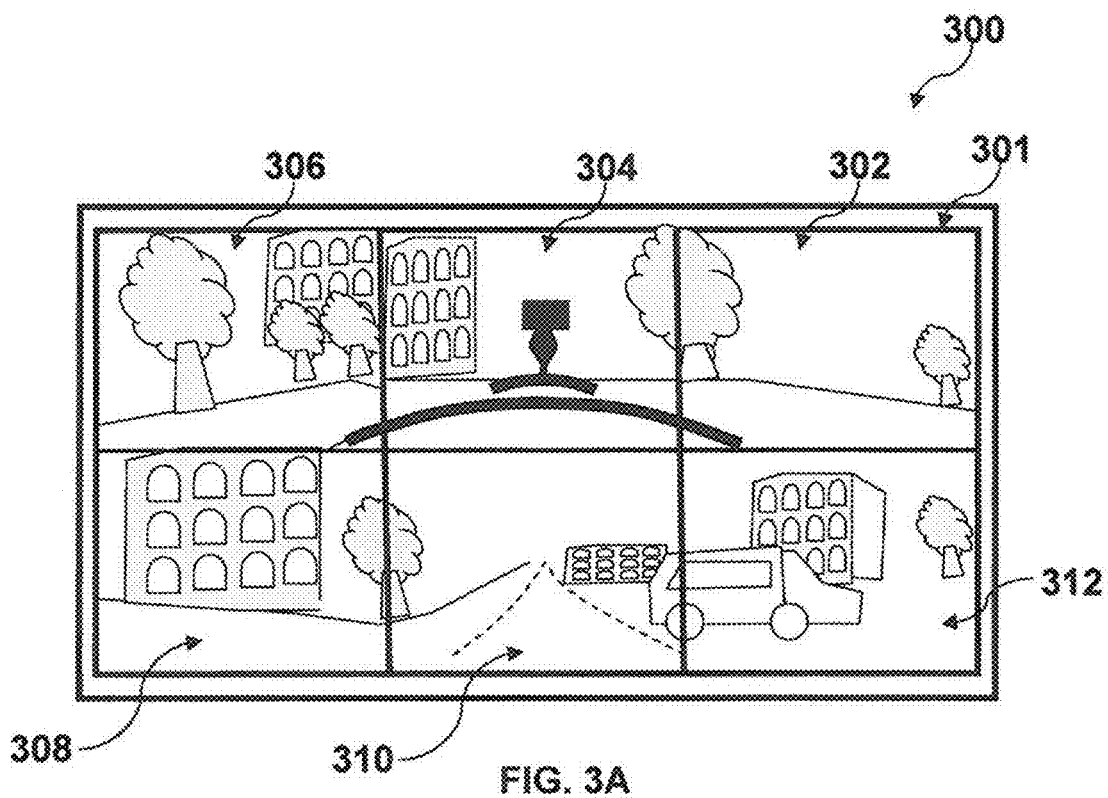
FIG. 3A illustrates a graphical user interface showing a detailed video output from different points of view, in accordance with the disclosed embodiments.

FIG. 3A illustrates a graphical user interface 300 showing a detailed video output 301 from different points of view, in accordance with the disclosed embodiments. The detailed video output 301 of the user interface 300 may be attached to the spectrum streams in "simulated real time", This means that wherever the GPS trail is currently located, the corresponding active spectrum streams will be displayed. The detailed video output 301 has a number of video outputs 302, 304, 306, 308, 310 and 312 from different points of view including night vision. The detailed video output 301 is displayed on screens as windows of vehicle, thus simulating 360 degree view. Note that this type of representation is also useful in commercial applications, similar to the "Street View" icon on "Google Maps".

Figure 3B:
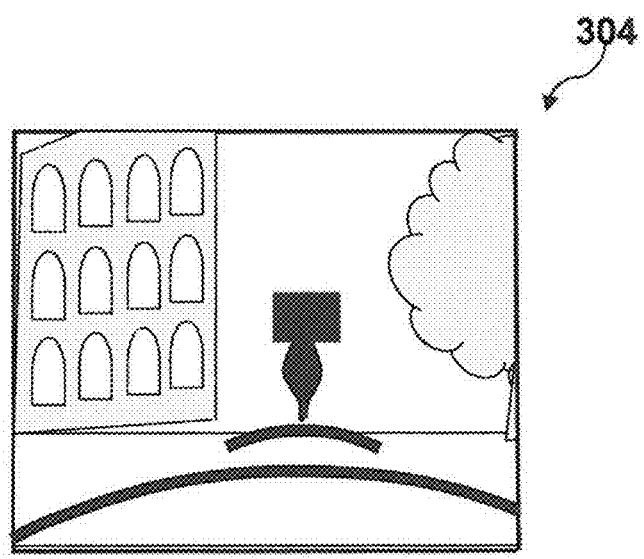
FIG. 3B illustrates a graphical user interface showing an enlarged video output of the detailed video output depicted in FIG. 3A, in accordance with the disclosed embodiments.

An enlarged video output 304 of the detailed video output 301 depicted in FIG. 3A is shown in FIG. 3B.

Figure 4:
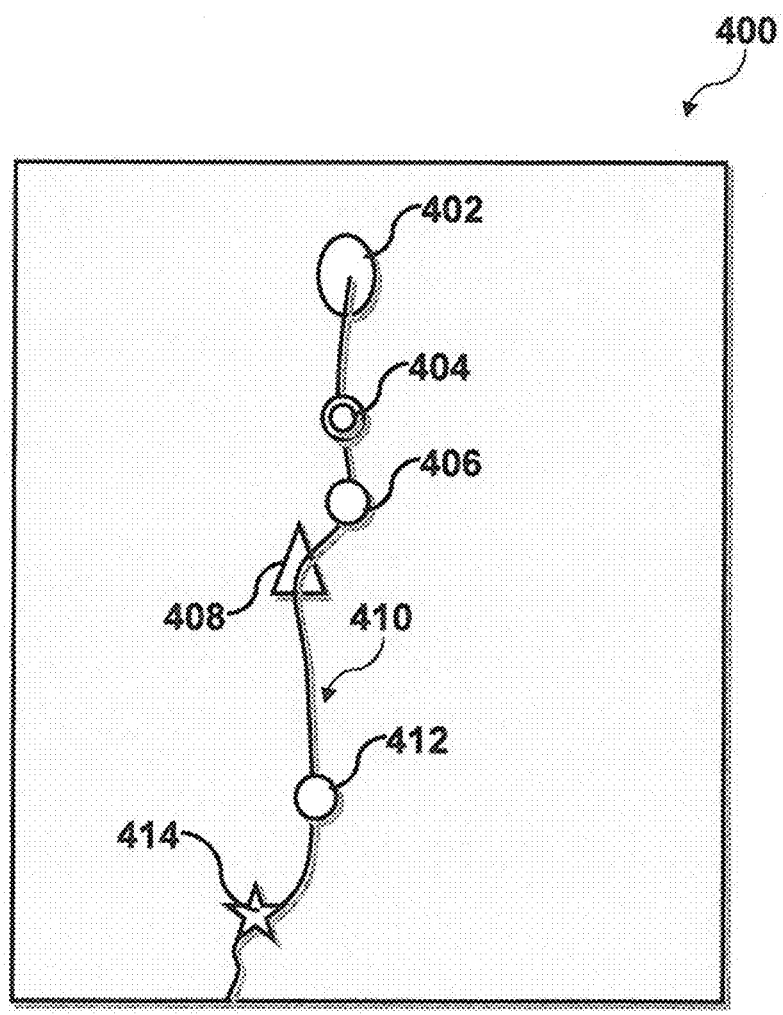
FIG. 4 illustrates a graphical user interface showing a overall reap an area, in accordance with the disclosed embodiments.

Referring to FIG. 4 a graphical user interface showing an overall map 400 a route 410 is disclosed. The starting point 402, areas of confirmed IED detonation 404, destination 414, current location 408 and recording points 406 and 412 of the route 410 are shown. The detailed video output 301 depicted in FIG. 3A and the enlarged video output 304 depicted in FIG. 3B are taken from the current location 408.

Note that the invention may employ different points of view that are displayed on screens as if they were the windows of a vehicle. The total vehicle simulator approach can implement the 360 degree sensor data in a realistic training environment. Also, there may be a map outline with points of interest that the user can select to transition to that portion of the route. Also note that the user may be able to control the speed of advancing through the GPS route, and thus the speed of the active streaming spectrum recordings. Each point of interest may be linked to a standard icon, and an image of that icon may be placed at the appropriate location on a GPS map trail, and along the playback control for the streaming spectrum recordings. The video/data stream may also be communicated in real time with the geolocation data.

Also note that the system allows for training soldiers pre-deployment using their deployment operating environment and provides authentic video to more accurately familiarize the soldier with a potentially hostile environment. Instead of using simulation video for training soldiers, they can quickly and accurately familiarize themselves with the operating environments into which they will actually be deployed.

Figure 5:
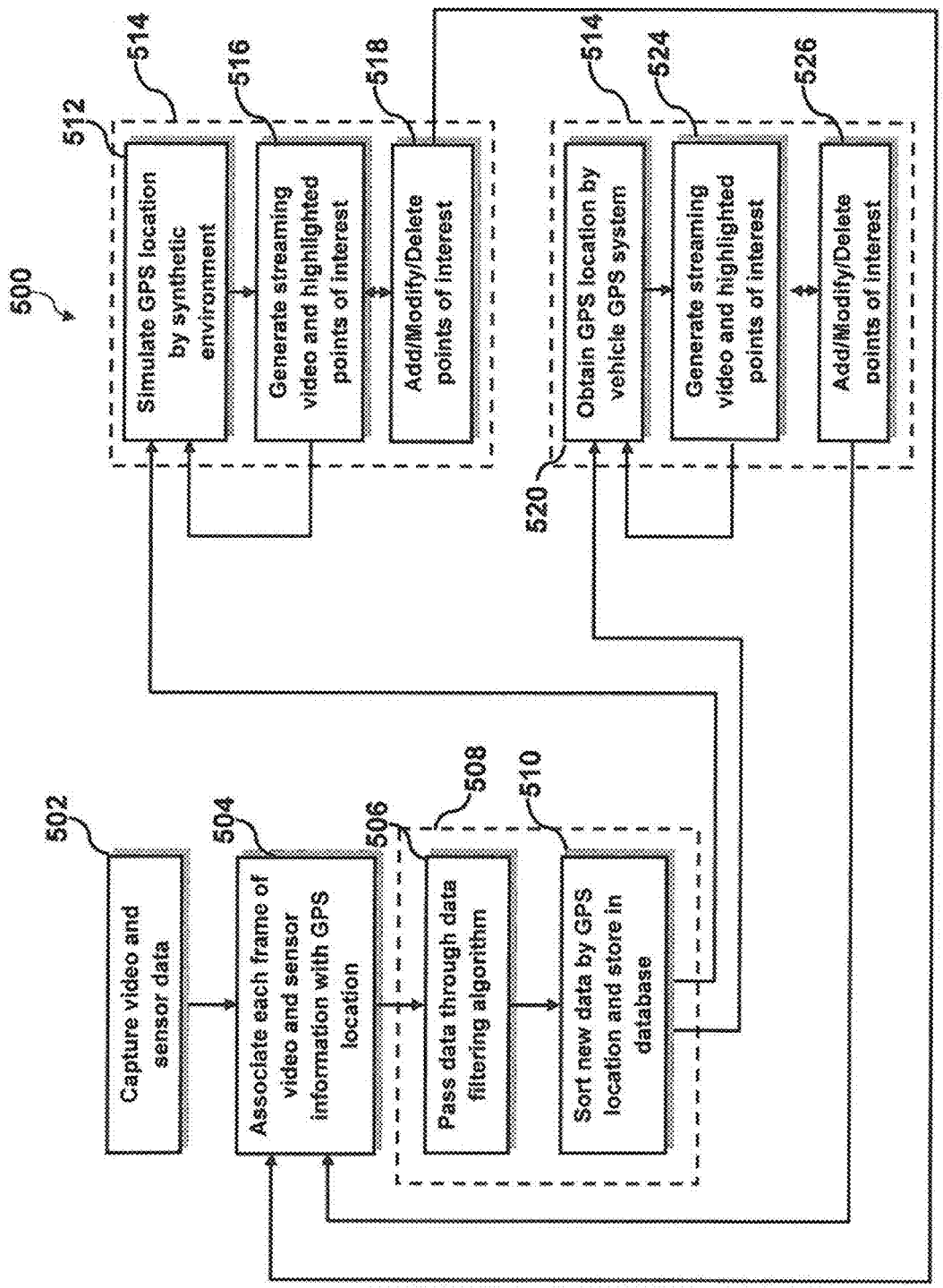
FIG. 5 illustrates a flow chart showing a process involved in geolocation linked streaming video system, in accordance with the disclosed embodiments.

Referring to FIG. 5, a flowchart 500 of a process involved in geolocation linked streaming video system depicted FIG. 1 is shown. First, as said at block 502 and 504, a vehicle captures video and sensor data, and associates each frame of the data to a GPS location. The data is then sent to a data management system, which can then distribute the data to a user interface. As illustrated at block 508 and 510, the data management system filters the data with a data filtering algorithm, and new data is sorted by GPS location and stored in a database. The user interface 514 may have for example a simulated environment mode and a field navigation mode.

As said at block 512, the simulated environment mode includes a GPS location simulated with a synthetic environment, like a vehicle simulator. Software generates streaming video and highlighted points of interest with spectrum data available based on database queries based on the desired GPS location as illustrated at block 516. Then as depicted at block 518, the user may then add, modify, or delete points of interest. As said at block 520, the field navigation mode includes obtaining a GPS location from a vehicle's GPS system. Software can then generate streaming video and highlighted points of interest with the data available from the database, using the GPS location obtained from the vehicle's GPS system as illustrated at block 524. Then as depicted at block 526, the user can also add to or modify the points of interest.

Figure 6:
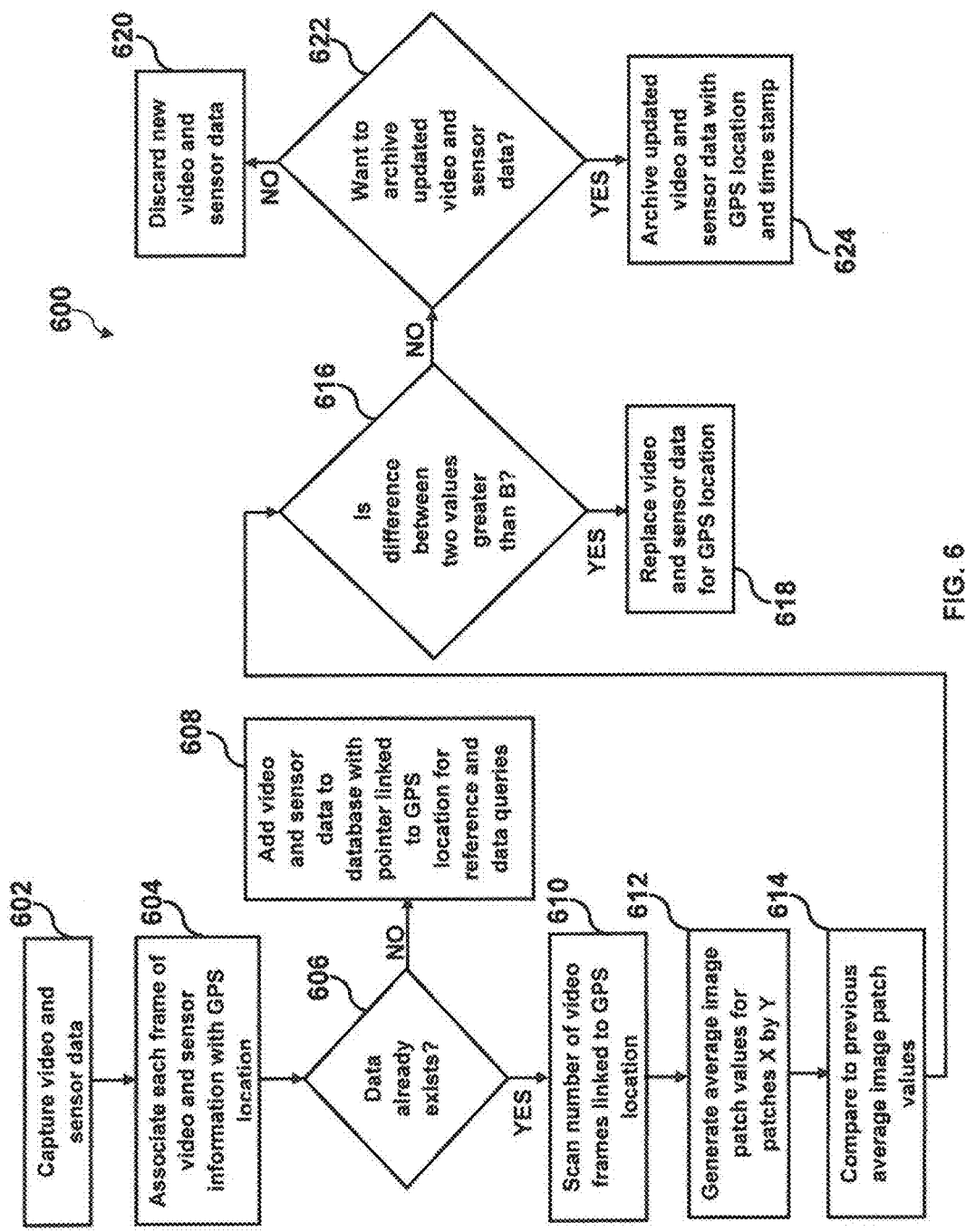
FIG. 6 illustrates a flow chart showing a process involved in a data filtering algorithm of FIG. 5, in accordance with the disclosed embodiments.

Referring to FIG. 6, a flowchart 600 of the data filtering algorithm is shown. 'X', 'Y', 'A', 'B' are the variables used by the algorithm. 'X' represents the image patch length measured in pixels, 'Y' represents the image patch width measured in pixels, 'A' represents a number of video frames linked to one GPS location and 'B' represents the amount of change in image patch from previous value measured in percent. As said at block 602 and 604, the vehicle captures video and sensor data and associates each frame of video and sensor data with a GPS location, The algorithm checks whether the data already exists for the GPS location as depicted at block 606. If the data doesn't exist for the GPS location, as illustrated at block 608, the video and sensor data is added to the database with a pointer linked to the specific GPS location for reference and data queries.

If data does exist for that location, each of the 'A' frames linked to the GPS location is scanned to generate average image patch values for patches 'X' by 'Y' as said at block 610 and 612. As depicted at block 614, the average image patch is compared to the sensor data. If there is a difference greater than value 'B', then the video and sensor data is replaced for that GPS location and the images patches that changed more than a determined threshold are flagged as illustrated at block 616 and 618. As said at block 622 and 620, if there isn't a difference greater than the value 'B', then the data is discarded. Else the sensor and video data may be archived with a time stamp and a flag for the specific GPS location as depicted at block 624.

Note that the invention may be used by farmers, ranchers, foresters, property managers, commercial real estate managers, apartment managers.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for data recording and linking data to geolocation coordinates comprising:
    recording a plurality of sensor data from a plurality of sensor positioned in a vehicle;
    linking said sensor data to coordinates of a specific location;
    selectively storing said sensor data in a database according to coordinates of said specific location, wherein selectively storing said sensor data includes a process of data filtering wherein said process of data filtering comprises of:
        recording said sensor data to said database when no data exists for coordinates of said specific location;
        generating an average image patch from video frames linked to coordinates of said specific location;
        comparing said sensor data with said average image patch;
        sorting said sensor data by GPS location received from a GPS receiver; and
        storing said sensor data along with a time stamp and a flag for the specific location to said database when there is a difference between said sensor data and said average image patch greater than a specific threshold; and
    generating a streaming video from said sensor data in response to queries to said database.

2. The method of claim 1, wherein the sensor data is recorded video.

3. The method of claim 1, wherein the specific location coordinates are GPS coordinates.

4. The method of claim 1, further comprising linking specific points of interest to the sensor data.

5. The method of claim 4, wherein a user can add, modify, and delete the points of interest with a user interface.

6. The method of claim 1 wherein generating a streaming video is completed in substantially real time.

7. The method of claim 1, wherein a plurality of sensors is selected from a group of motion detector, microphone, temperature sensors, chemical sensors, biological sensors and radiation sensors.

8. The method of claim 1, further comprising archiving said sensor data linked to coordinates of said specific location when the difference between said sensor data and said average image patch less than said specific threshold.

9. A system for data recording and linking data to geolocation coordinates comprising:
    a plurality sensor for generating a plurality of sensor data, wherein said sensor data is linked to coordinates of a specific location;
    a database for selectively storing said sensor data according to coordinates of said specific location;

a data management system for filtering said sensor data by utilizing a data filtering unit wherein said data filtering unit comprising:
    a first recording unit for recording said sensor data to said database when no data exists for coordinates of said specific location;
    an image generation unit for generating an average image patch from video frames linked to coordinates of said specific location;
    a comparator for comparing said sensor data with an average image patch; and
    a second recording unit for sorting the sensor data by GPS location received from a GPS receiver and recording said sensor data along with a time stamp and a flag for the specific location to said database when there is a difference between said sensor data and said average image patch greater than a specific threshold;
a user interface for displaying data from said data management system; and
a video generation unit for generating a streaming video from said sensor data in response to queries to said database.

10. The system of claim 9, wherein said sensor data is recorded video.

11. The system of claim 9, wherein coordinates of said specific location are GPS coordinates.

12. The system of claim 9, wherein specific points of interest is linked to said sensor data.

13. The systems of claim 9, wherein a user can add, modify, and delete points of interest by utilizing said user interface.

14. The system of claim 9, wherein said streaming video is generated and completed in substantially real time.

15. The system of claim 9, wherein said sensor data is archived and linked to coordinates of said specific location when difference between said sensor data and said average image patch is less than said specific threshold.

16. The system of claim 9, wherein said plurality of sensors is selected from a group of motion detector, microphone, temperature sensor, chemical sensor, biological sensor and radiation sensor.

17. The system of claim 9, wherein said streaming video is augmented with public domain video summarization software to automatically create searchable geolocation databases in the said data management system.

* * * * *